United States Patent [19]
Frey et al.

[11] Patent Number: 5,483,064
[45] Date of Patent: Jan. 9, 1996

[54] POSITIONING MECHANISM AND METHOD FOR PROVIDING COAXIAL ALIGNMENT OF A PROBE AND A SCANNING MEANS IN SCANNING TUNNELING AND SCANNING FORCE MICROSCOPY

[75] Inventors: Eric M. Frey; Norman E. Ragan, Jr., both of Tucson, Ariz.

[73] Assignee: Wyko Corporation, Tucson, Ariz.

[21] Appl. No.: 184,482

[22] Filed: Jan. 21, 1994

[51] Int. Cl.$^6$ .............................. G21K 5/10; H01J 37/00
[52] U.S. Cl. ................ 250/442.11; 250/306; 250/491.1
[58] Field of Search ........................ 250/491.1, 442.11, 250/306, 307

[56] References Cited

U.S. PATENT DOCUMENTS

| | | | |
|---|---|---|---|
| 4,877,957 | 10/1989 | Okada et al. | 250/306 |
| 4,968,914 | 11/1990 | West et al. | 310/328 |
| 5,117,110 | 5/1992 | Yasutaki | 250/491.1 |
| 5,260,577 | 11/1993 | Abraham et al. | 250/442.11 |
| 5,286,977 | 2/1994 | Yokayama et al. | 250/442.11 |
| 5,306,919 | 4/1994 | Elings et al. | 250/442.11 |
| 5,360,974 | 11/1994 | Hammond et al. | 250/442.11 |

OTHER PUBLICATIONS

Jahanmir, J. et al., "Scanning Microscopy" vol. 6, No. 3, 1992 (pp. 625–660).

*Primary Examiner*—Bruce C. Anderson
*Attorney, Agent, or Firm*—Antonio R. Durando

[57] ABSTRACT

A scanning microscope wherein the probe operates at all times in alignment with the piezoelectric element providing the scanning motion. A sample is slidably connected to the piezoelectric element and the target area on the sample is positioned substantially coaxially with the probe and the scanning element prior to commencement of the scanning operation. A particular embodiment of a sample positioner is provided that eliminates any interference by the positioner with the sample during scanning.

12 Claims, 6 Drawing Sheets

POSITIONING MECHANISM AND METHOD FOR PROVIDING COAXIAL ALIGNMENT OF A PROBE AND A SCANNING MEANS IN SCANNING TUNNELING AND SCANNING FORCE MICROSCOPY

BACKGROUND OF THE INVENTION

1. Field of the Invention

This invention is related in general to scanning tunneling and scanning force microscopy. In particular, it describes a method and a mechanism for always operating the scanning means of such microscopes in coaxial alignment with the instrument's probe irrespective of the portion of sample being scanned.

2. Description of the Related Art

During the last decade scanning tunneling microscopes (STM's) and scanning force microscope (SFM's; also known as atomic force microscopes) have evolved into powerful tools in science and technology for measuring microscopic features and physical properties of materials. Scanning tunneling microscopy is based on the principle of quantum mechanical tunneling of electrons between two electrodes, such as an atomically sharp metal tip and a sample, under an applied electric field. A potential is applied through a feedback control system that maintains a constant current between the tip and the sample by controlling the vertical distance between the two. In one configuration, the tip is held stationary while the sample is mounted on piezoelectric ceramic material that is capable of moving the sample in the x, y and z directions with respect to the tip by the application of electric fields to the ceramic. In another configuration, the sample is stationary and the tip is mounted on a scanning piezoelectric ceramic. In either case, the accurate positioning of the tip in the x, y and z directions relative to a target point on the sample allows high-resolution point measurements of surface topography, electrical conductivity, electronic and atomic structure, and chemical composition.

Scanning force microscopy functions on the principle of a conventional stylus profilometer having a sharp point mounted on a flexible cantilever and moved across the surface of a sample. The motion of the stylus is correlated to a property being observed as a target point in the sample is being scanned by means equivalent to the ones used by STM's. Scanning force microscopy is used to study various interactions between a probe and a surface, such as interatomic, frictional, magnetic, electrostatic, and adhesion forces In addition, SFM's are used to produce high-resolution images for both conductive and insulating materials. As in the case of STM's, either the probe or the sample is mounted on a scanning mechanism that allows the relative motion of the two along the surface of the sample. Scanning is conducted under one of three modes of operation. In the first mode, the deflection of the cantilever is held constant by adjusting the vertical position of the probe or the sample with a feedback control loop (constant force mode). In the second mode, the sample is kept at a constant height and the variation of the deflection of the cantilever during scanning is used to produce a topography of the surface. In the third mode, the cantilever is modulated near its resonance frequency, such as by a piezoelectric unit, and the amplitude or phase change of the vibration is monitored to produce a measurement of the distance between the probe and the surface of the sample.

Scanning tunneling and atomic force microscopes based on these principles are well known in the art and are described in detail in the literature. See, for example, Jahanmir, J. et al., "Scanning Microscopy," Vol. 6 No. 3, 1992 (pp. 625–660). The present invention is directed to the class of scanning tunneling and atomic force microscopes that utilize a fixed probe interacting with a sample mounted on a piezoelectric mechanism that provides the scanning action required for the operation of the system. A typical such system for an STM is shown schematically in FIG. 1 for illustration. A fixed probe 10 mounted on a rigid support block 12 is kept within tunneling distance of the surface 14 of a sample 16 mounted on a piezoelectric element or tube 18 by a conventional feedback mechanism. The tunnel current I resulting from a tunnel voltage P applied between the probe and the sample is converted to an output voltage V by a current detection circuit 20. The output voltage V is compared to a setpoint reference value S to produce an error signal E, which in turn is converted to a control voltage by control circuitry 22 that adjusts the z position of the ceramic to minimize the error. The control voltage is stored as a function of x and y positions and related to the topography of the surface 14. Motion of the sample in the x and y directions is provided, usually in raster fashion, by scanning voltages applied to the piezoelectric element 18 (not illustrated in the FIGURE).

Thus, the piezoelectric element 18 provides the vertical motion as well as the scanning motion of the sample 16 with respect to the fixed probe 10. Typically, piezoelectric ceramics are either mounted in an orthogonal tripod arrangement for independently scanning the x, y and z directions or consist of a single-tube ceramic sectioned into four equal parts parallel to the axis of the tube. Different voltage potentials applied to the various sections cause different degrees of expansion of the ceramic sections that result in x-, y- and z-directional movement of a sample stage connected to the top of piezoelectric element. The movement so produced in the x-y plane provides the scanning of the surface of the sample 14 by the tip of the stationary probe 10 (see FIG. 1).

One of the design specifications for a typical STM system is that the tip-to-sample position control be better than the resolution desired for the application of interest. Thus, for example, for atomic imaging the tip position has to be resolved 0.1 angstrom vertically and 1 angstrom laterally and the dynamic range required is a few thousand angstroms in the x, y and z directions. Piezoelectric ceramics, which are capable of position control within 0.1Å and have a dynamic range of several micrometers, satisfy the scanning requirements of most systems once the target of interest in a sample is positioned directly under the point of the probe. Between scanning operations, coarse positioning of the tip with respect to the sample is provided by translational mechanisms that move either the probe or the piezoelectric/sample assembly and permit the precise positioning of the tip of the probe on the target area on the surface of the sample, typically with the aid of optical instrumentation. The target area is then scanned by the piezoelectric action described above.

During horizontal scanning, the piezoelectric tube 18 of typical STM or SFM apparatus provides lateral movement of the sample stage connected to it by bending in the direction of motion as a result of the net effect of the voltages applied to the ceramic's various sections. Therefore, such bending introduces a tilt $\alpha$ in the position of the sample 16 that becomes progressively pronounced as the limits of the scanning range of the piezoelectric element 18 are approached, as illustrated in FIG. 2 (in exaggerated fashion for clarity).

This tilt, which is typically in the order of seconds of a degree, is the source of several problems that the present invention is directed at solving. The first problem is a material reduction of the vertical operating range between the probe 10 and the sample 16 when the probe is aligned with a peripheral portion of the sample, as illustrated in FIG. 3. Since the probe 10 is positioned over the target area by the translational mechanism 24 (FIG. 2) but is stationary during scanning, its distance d from the sample is obviously affected by any tilt $\alpha$ in the plane of the sample and the variation is progressively increased as the probe is further removed from the vertical axis A of the piezoelectric element (in its relaxed state). Thus, for example, when the sample is raised toward the probe by the tilting action resulting from scanning toward the left of the sample (requiring the piezoelectric tube to bend toward the right), the probe may press against the sample and produce highly distorted images (FIG. 3). When the sample is lowered away from the probe by the tilting action, as illustrated in phantom line in FIG. 3, the probe may be outside the vertical range of the piezoelectric element and again produce highly distorted images or no images at all.

The second problem associated with the prior art is related to the hysteresis that all piezoelectric elements show during the electromechanical cycles that produce scanning. In order to position the probe at the appropriate distance from the sample, because of the tilt $\alpha$ in the plane of the sample, the vertical motion required of the piezoelectric element is greater when the probe is not aligned with the vertical axis A of the scanning piezoelectric element. Accordingly, all hysteresis effects experienced between scanning operations become more pronounced as the target point is moved away from the axis A of the piezoelectric element and are more difficult to correct by means of standard electronic circuitry.

A third problem is related to the nonlinear response of piezoelectric elements to applied voltages. As in the case of hysteresis, the tilt of the sample also causes the piezoelectric element to operated in less linear regions when the scanning is performed over a target located away from the vertical axis A of the piezoelectric ceramic. This higher degree of nonlinearity distorts the voltage readings and introduces an additional source of error that must be corrected by numerical or other means. This invention provides simple solutions that materially improve the effects of these problems in the operation of STM's and SFM's.

BRIEF SUMMARY OF THE INVENTION

One general objective of this invention is a scanning approach that minimizes the effects of the sample tilt that is necessarily introduced by scanning with piezoelectric-actuated mechanisms.

A specific goal of the invention is a method and apparatus for scanning that avoid the vertical-range problem encountered when a sample is scanned at a point out of alignment with the main axis of the piezoelectric element used to produce the scanning motion.

Another goal is a method and apparatus that ensure scanning with minimal effects from the hysteresis of the piezoelectric element.

Yet another goal is a method and apparatus that ensure scanning with minimal effects from the nonlinearity of response of the piezoelectric element.

Another objective of the invention is a mechanism for positioning the sample that, consistently with these goals, provides a take-up gap around the sample to ensure its free movement during scanning.

Still another objective is a sample-positioning mechanism that provides a take-up gap around the sample automatically and independently of a user's visual response and manual dexterity.

A final objective is a design for STM's and SFM's that can be implemented easily and economically according to the above stated criteria.

Therefore, according to these and other objectives, the present invention consists of scanning tunneling and atomic force microscopes wherein the probe operates at all times in alignment with the piezoelectric element providing the scanning motion. The sample is slidably connected to the piezoelectric element and the target area on the sample is positioned substantially coaxially with the probe and the scanning element prior to commencement of the scanning operation. A particular embodiment of a sample positioner is provided that eliminates any interference by the positioner with the sample during scanning.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
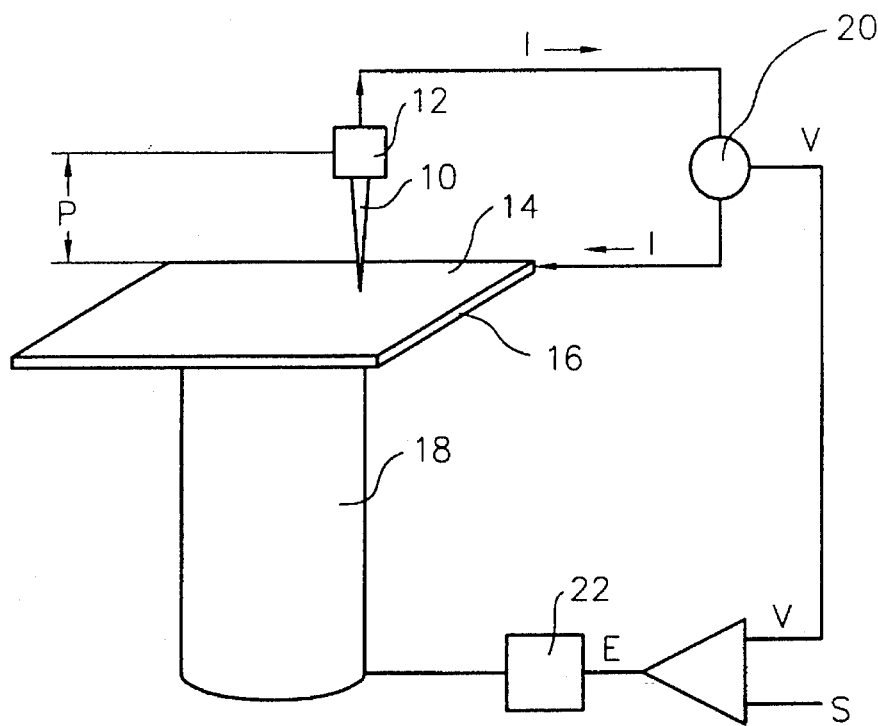
FIG. 1 is a schematic representation of the operation of a scanning tunneling microscope wherein the scanning motion is provided by a piezoelectric element connected to the sample being scanned.
Figure 2:
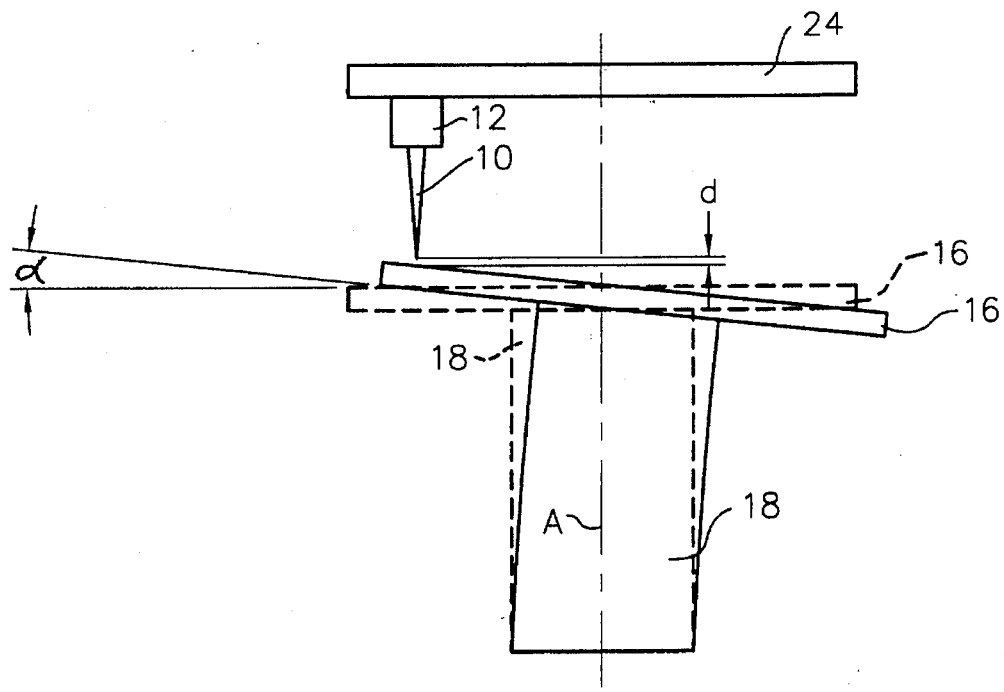
FIG. 2 is a schematic representation of the tilt of a sample introduced by the scanning motion of a piezoelectric element connected to the sample in conventional scanning microscopy.
Figure 3:
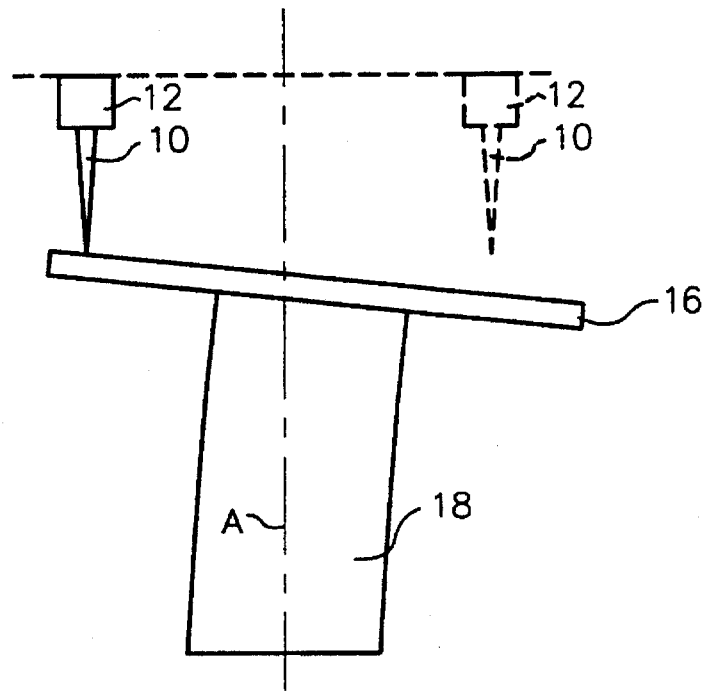
FIG. 3 is a schematic representation of the effects of the tilt shown in FIG. 2 on the distance between the probe and the sample when the target area on the sample is away from the vertical axis of the piezoelectric element producing the scanning motion of the sample.

The present invention consists of two main concepts that differentiate it from the prior art. The first one relates to a mode of operation that is based on the permanent alignment of the probe of the instrument with the main axis of the piezoelectric element providing the scanning motion (the instrument may be any type of scanning microscope having the sample stage mounted on the scanning device). The second concept relates to a sample positioning mechanism that allows the precise placement of the target areas of interest in the sample under the tip of the probe between scanning operations without interfering with the sample during scanning. Both concepts are necessarily related because the permanent alignment of the probe and scanning element by definition prevents the use of translational mechanisms to direct the probe to a particular target area on the sample or the target area on the sample to a particular position under the probe, as done heretofore for coarse targeting. Therefore, the sample itself must be moved to place the target area under the probe and a suitable mechanism to effect that movement in efficient fashion between scanning operations must be provided. As is detailed below, a problem of implementation for any such mechanism is its potential interference with the sample as a result of the sample motion during scanning. This problem is solved by providing a stand-off approach for placing the sample stage to the proper position relative to the probe and by incorporating a known amount of take-up gap between the stand-off and the positioning mechanism.

It is noted that the embodiments of the present invention are described with reference to x, y and z orthogonal coordinates wherein x and y define a horizontal plane and z defines a vertical direction, but it is obvious that the structure and operation of the features detailed herein could be rotated in any direction with equivalent results. Similarly, reference to translational motion is at times described as coarse in contrast to the very fine movement (in the order of several microns, with control within 0.1Å) provided by the scanning piezoelectric means. In fact, though, as those skilled in the art understand, the positioning of the target area on the surface of a sample directly under the tip of the probe is a very exact operation that requires precision instrumentation and mechanisms. Finally, it is understood that the sizes of the various components shown in the drawings are not drawn to relative scale because of the microscopic dimensions of some features (such as the probe 10 and the x-y motion of the piezoelectric tube 18) in comparison to others illustrated in the FIGURES. Rather, they are represented only schematically for illustration.

Figure 4:
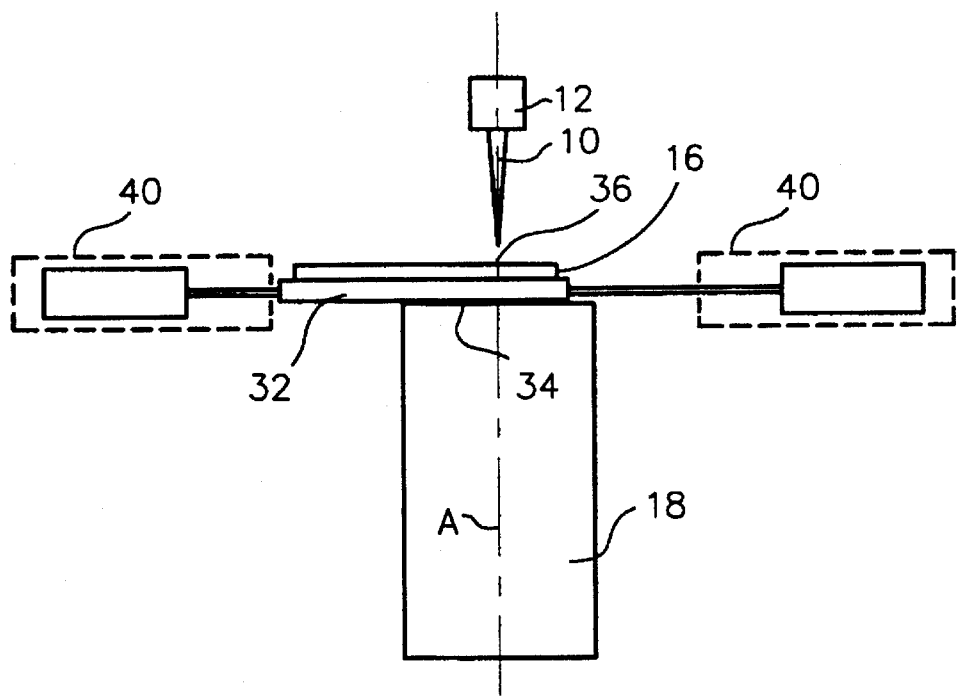
FIG. 4 is a schematic representation of the fixed coaxial arrangement between the probe and the scanning piezoelectric tube, including a schematic illustration of the sample positioning mechanism, of a scanning microscope according to this invention.

Referring to the drawings, wherein like parts are designated throughout with like numerals and symbols, FIG. 4 illustrates in schematic view the basic mode of operation and structure of a scanning microscope 30 according to this invention. It comprises a probe 10 having its main axis permanently disposed coaxially with the vertical piezoelectric tube 18 utilized for providing scanning to the system (note that the vertical motion required for making measurements during scanning may be provided by other means). A flat stand-off 32 is slidably mounted on the flat top 34 of the piezoelectric tube 18, thereby being positioned on a horizontal plane substantially subject to x-y movements (and tilt) as a result of voltage gradients applied to the tube 18. A sample 16 is mounted on the stand-off 32 (either directly or through a sample stage, as illustrated below) and positioned with the target area for investigation directly under the tip 36 of the probe 10. Such precise placement is accomplished by a sample-positioning mechanism 40 that is capable of pushing the stand-off 32 in the x-y directions and cause it to slide over the top of the piezoelectric tube 18, thereby also moving the sample 16 to the desired location.

It is important to stress the fact that the structural members described schematically in FIG. 4 consist of high-precision, small components that cannot be properly handled or adjusted without the use of precision instrumentation, such as a focused light source and an optical viewfinder, that is also housed within the support structure of the scanning microscope. In addition, depending on the type of scanning microscope with which the present invention is combined, other hardware essential to the functioning of the microscope is also housed within the same support structure, such as means for sensing the movement of the probe and for controlling the vertical distance between the probe and the sample. Therefore, any mechanism 40 used to translate the stand-off and place the target area of the sample under the probe must be operable within minute tolerances in the crowded environment surrounding the probe/sample area. Manual translation would not be acceptable because it is not sufficiently precise to place the sample in the desired spot, even with the aid of a viewfinder, because of the relatively very coarse spatial control of human motion. On the other hand, the use of mechanical devices, either manually or electronically operated, allows fine adjustments to the position of the sample by pushing the stand-off precisely to the point of interest, but then must be removed to avoid continued contact with the standoff which would interfere with its motion during scanning. Accordingly, a sample positioner is needed that is compatible with the overall general configuration of scanning microscopes and is implemented with hardware capable of slidably moving the sample on a horizontal plane and retracting away from any structure connected to the sample to eliminate the possibility of contact during the scanning procedure.

Figure 5:
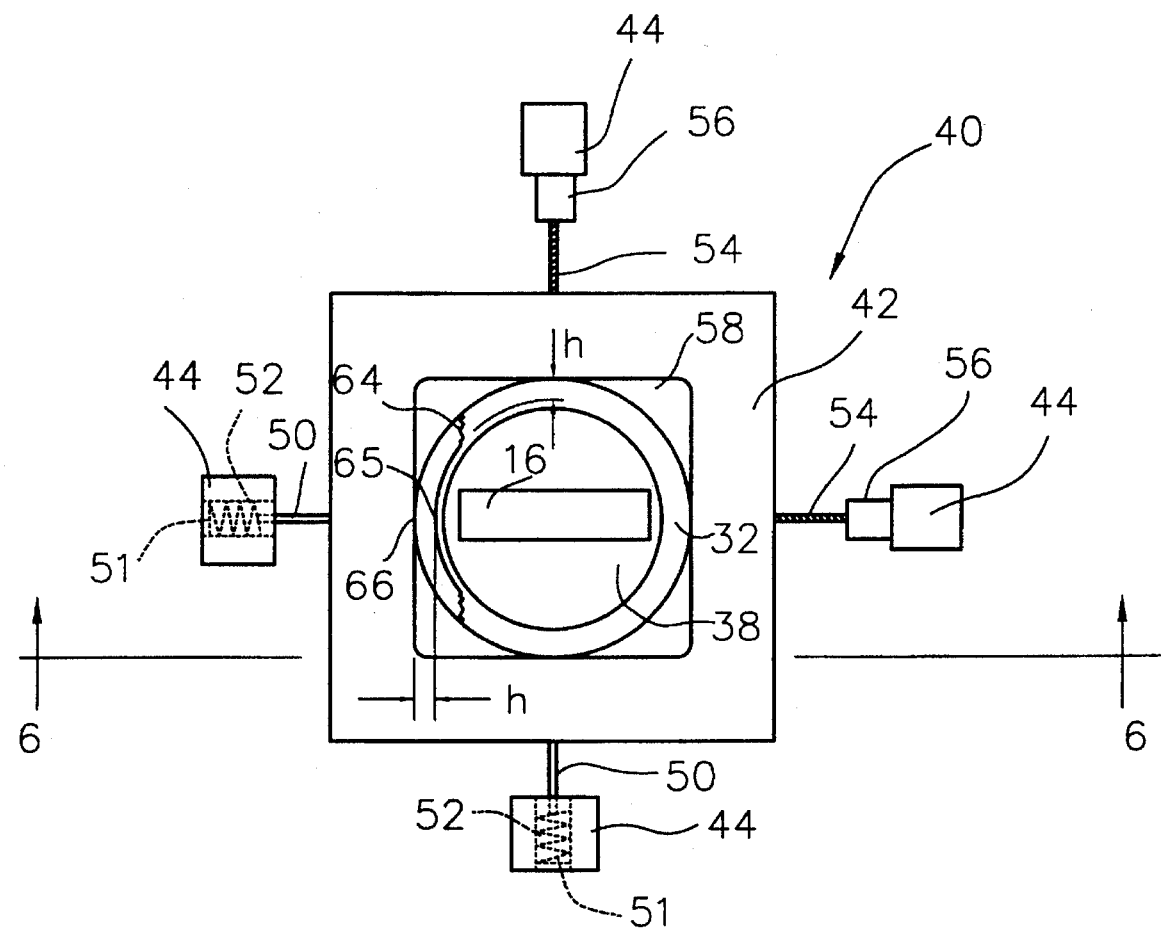
FIG. 5 is a schematic plan view of a sample positioner according to the present invention.
Figure 6:
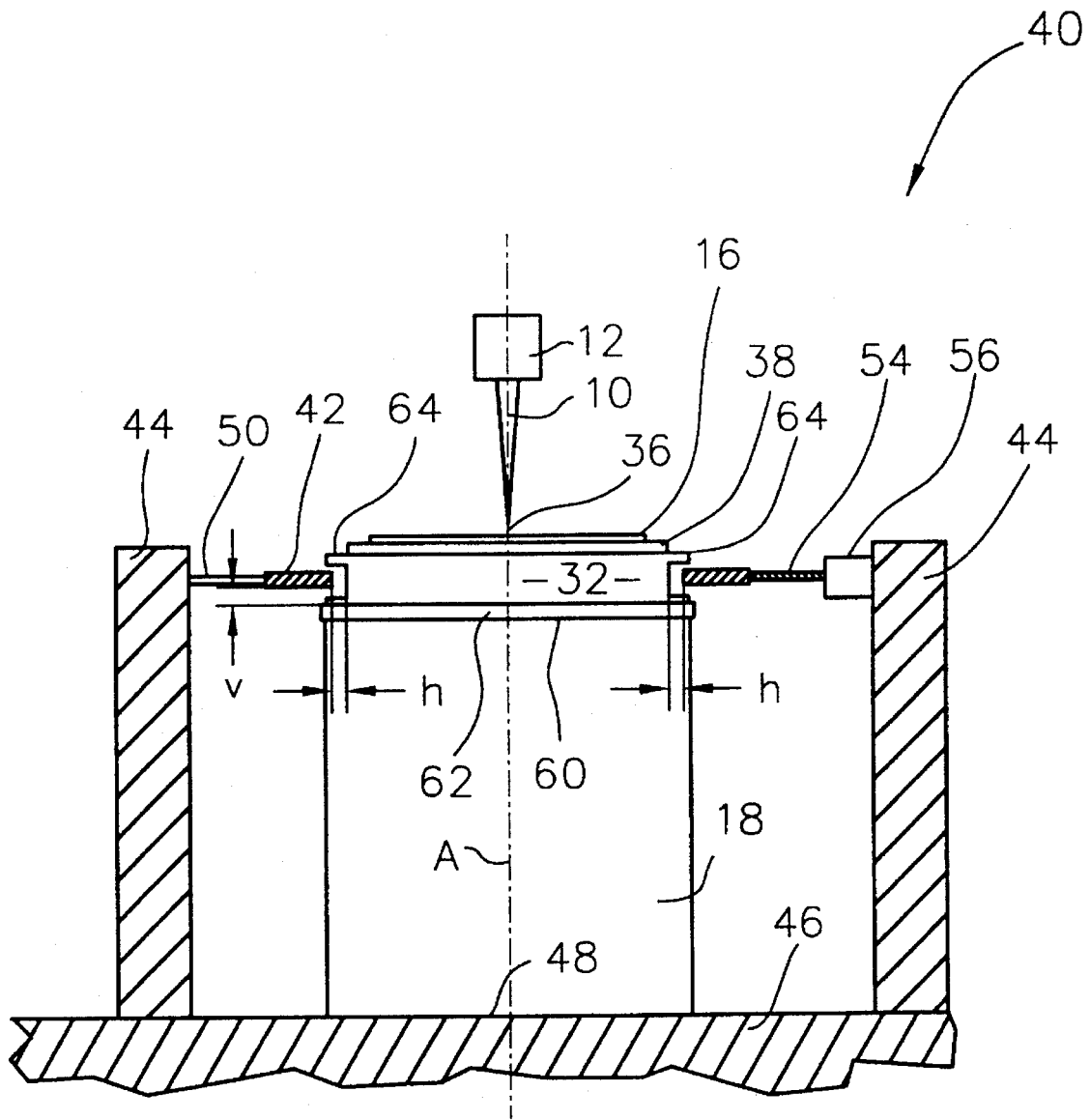
FIG. 6 is a schematic elevational view of the sample positioner of the invention taken from line 6—6 in FIG. 5.

FIGS. 5 and 6 illustrate the basic components of the preferred embodiment of a sample positioner according to the invention. FIG. 5 shows an isolated top view of the positioner 40, which consists of a horizontal plate 42 anchored to portions of a support structure 44 that is integral with or rigidly connected to the horizontal base 46 (FIG. 6) that supports the bottom end 48 of the vertically-disposed piezoelectric tube 18. The plate 42 is adapted for horizontal movement in any direction. As illustrated in the FIGURES, this feature may be accomplished by means of orthogonal, horizontally disposed plungers 50 slidably engaged by conforming guides 52 in the support structure 44 together with cooperatively-aligned push-pull mechanisms for sliding the plungers 50 in and out of the guides 52, as necessary in order to effect the desired translation of the plate 42 to target x-y coordinates. The plungers 50 or the plate 42 may be spring-loaded by means of springs 51 pushing against the plungers in the guides 52 (as illustrated in the-drawings) or against the plate 42 to enhance the plate's rapid response in the pull mode. The push-pull mechanisms may consist, for example, of screw gears 54 attached to the plate 42 (or simply pushing against a springloaded plate) and engaged by drive-gear devices 56 mounted on the support structure 44. As is clearly understood in the mechanical arts, each screw gear 54 so disposed is capable of bidirectional linear motion, thus providing, in combination, the push-pull function required to effect translation of the plate 42 to any x-y coordinates within the range of the screw gears 54. Obviously, a simple screw or set of screws rotatably mounted on the structure 44 and adapted for pushing on the plate 42 would provide equivalent function, but such an arrangement would not be suitable for automatic control. The drive-gear devices 56 may be actuated manually, such as by means of a rotating knob, or mechanically, such as by high-precision stepper motors, possibly through a system of reducing gears that ensure microscopic motion of the plate 42 for each turn of a drive gear. Any alternative mechanism that would permit the precise motion of the plate 42 in the x-y plane would be equivalently suitable to practice the invention.

The plate 42 contains an opening 58 sufficiently large to surround a coplanarly-disposed stand-off 32 adapted for slidable coupling with the top end 60 of the piezoelectric tube 18, preferably through an intermediate scanning stage 62 made of low-friction material that is fixedly attached to the piezoelectric tube (FIG. 6). The relative sizes of the opening 58 and the stand-off 32 are chosen so that a sufficient horizontal take-up gap h is present in all directions when the two are coaxially aligned to ensure the unobstructed horizontal movement of the stand-off 32 as the top end 60 of the piezoelectric tube moves in the x-y plane as a result of scanning voltages applied to it. (The gap h is seen in FIG. 5 in the partially cut-away portion of the lip 64, which is described in detail below.) Although any shapes for the opening 58 and stand-off 32 that allow this condition to be met are acceptable to practice the invention, a circular stand-off and a substantially square opening are preferred. To the extent that the stand-off would never come into contact with the corners of the square (it can only come to within a distance equal to its radius), the precise shape of the opening 58 in the vicinity of the corners (illustrated by rounded corners in the FIGURES) is irrelevant to the functioning of the apparatus. If applicable for the particular type of scanning microscope combined with the invention, a vertical gap v must also be left between the top surface of the scanning stage 62 (or of the piezoelectric tube 18, if a scanning stage is not used) and the bottom surface of the plate 42 in order to ensure the unobstructed vertical movement of the scanning stage (and correspondingly of the stand-off and sample) as the top end 60 of the piezoelectric tube 18 moves in the z direction as a result of vertical positioning voltages applied to it. Inasmuch as the horizontal range of typical piezoelectric elements is about 100 microns, a horizontal gap h larger than about 50 microns is sufficient for these purposes. Similarly, since the vertical measurements, and therefore the vertical range required for the piezoelectric element, are in the order of about 15 microns, a vertical gap v of a fraction of a millimeter is suitable to practice the invention.

Thus, a sample 16 mounted on top of a sample stage 38 may be moved in the x-y plane as needed to place the specific target area to be scanned directly under the tip of the probe 10. This is accomplished by pushing or pulling, as necessary, the stand-off 32 in the x and y directions by the amount required to meet the target position. The plate 42 is then retracted by an amount sufficient to disengage the stand-off 32 and ensure a horizontal gap h around the entire edge of the stand-off. Since the take-up gap h is predetermined by the dimensions and geometry of the assembly and corresponds to a fixed motion of the devices 56 (such as, for example, a certain number of turns of the screw gears 54) this step may be easily implemented automatically so as to avoid reliance on a user for fine adjustments of the positioner plate 42.

Obviously, during the translational movement of the stand-off, the horizontal motion of the plate 42 must also be unobstructed in all directions by any of the components constituting the hardware of the invention and a sufficient range must be provided to reach each end of the sample 16 being analyzed. Typically, sample dimensions have been limited to several millimeters because of the tilt-distortion problems that this invention is addressing, but a sample of any size could be analy in equivalent fashion by the arrangement illustrated in FIGS. 5 and 6. Therefore, the range of horizontal movement of the plate 42 need only be commensurate with the expected size of the samples analy by the scanning microscope.

Figure 7:
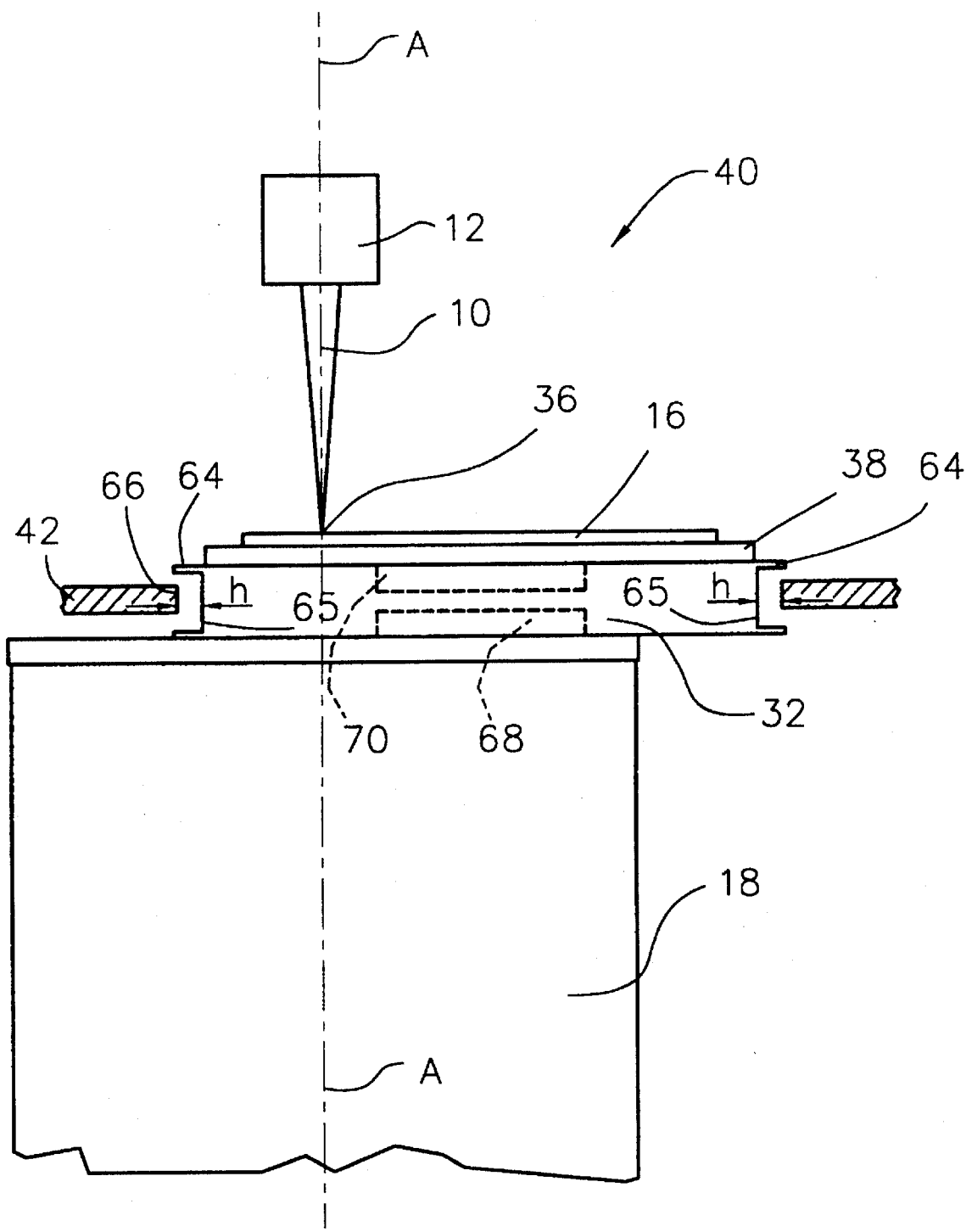
FIG. 7 is a more detailed view of the stand-off portion of the sample positioner of the invention showing the horizontal gap between the stand-off and the positioner plate around it.
Figure 8:
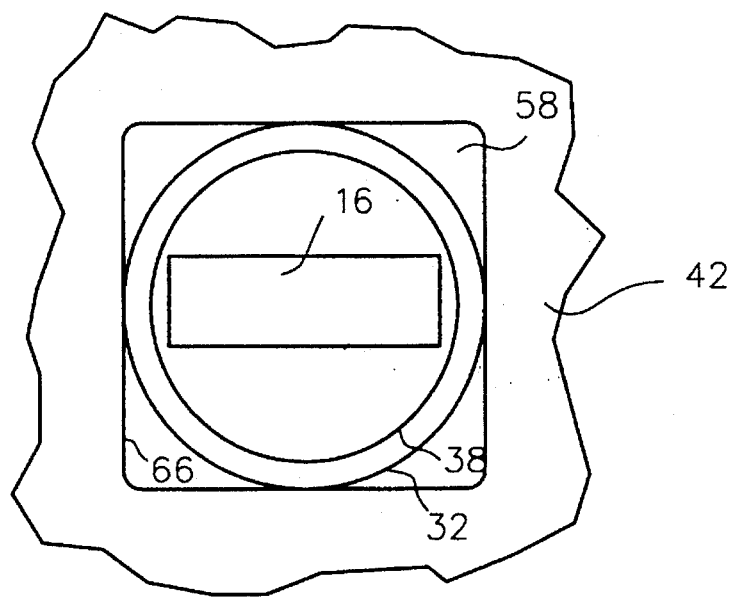
FIG. 8 is a plan view of the apparatus shown in FIG. 7.

FIG. 7 illustrates in more detail the stand-off portion of the preferred embodiment shown schematically in FIGS. 5 and 6. Since a very small horizontal take-up gap h (in the order of 150μ) is sufficient to ensure the free scanning motion of currently available piezoelectric elements 18, the stand-off can be incorporated as a free-moving but coupled component of the positioner 40 by providing lips 64 along the outer edge of the stand-off extending over a conforming inner edge 66 of the opening 58. By carefully sizing the inner diameter of the stand-off 32 (at the side edge 65) in relation to the dimensions of the opening 58, the desired gap h may be maintained around the stand-off 32 even though the outer diameter of the stand-off (at the lips) is larger than the opening 58, thus ensuring that the stand-off is loosely engaged by the plate 42, as illustrated in the plan view of FIG. 8. In practice, a gap h of about 500μ is preferred because of standard machining tolerances that would render prohibitively expensive the manufacture of components with a smaller, more precise gap. Thus, a gap of approximately 500μ is suitable for manufacturing purposes and is well outside the scanning range on conventional piezoelectric scanners. Obviously, the precise width of the lips 64 is not critical so long as sufficient to overlap the opening 58 and provide interlocking connection with the plate 42.

In operation, the plate 42 is actuated to position the portion of the sample to be scanned directly under the tip of the probe 10, which is aligned with the axis A of the scanning element 18. Then the plate is moved back from the stand-off by an amount sufficient to leave at least a gap h in all directions. Since this distance is predetermined, this step is easily accomplished either manually or automatically, such as by knowing the corresponding turns of the actuating gears or screws necessary to effect a desired translation both in the x and y directions after the sample has reached its intended position. In FIG. 7, for example, the sample is shown as being positioned for scanning of its left edge after a corresponding translation of the stand-off 32 and sample stage 38 toward the right side of the FIGURE. As understood from the FIGURE, scanning may now occur according to conventional processes with the probe 10 coaxially aligned with the scanning tube 18 within the tolerances of the gap h in all directions, so that minimal distortions are produced by the tilt of the top surface 34 of the tube.

Figure 9:
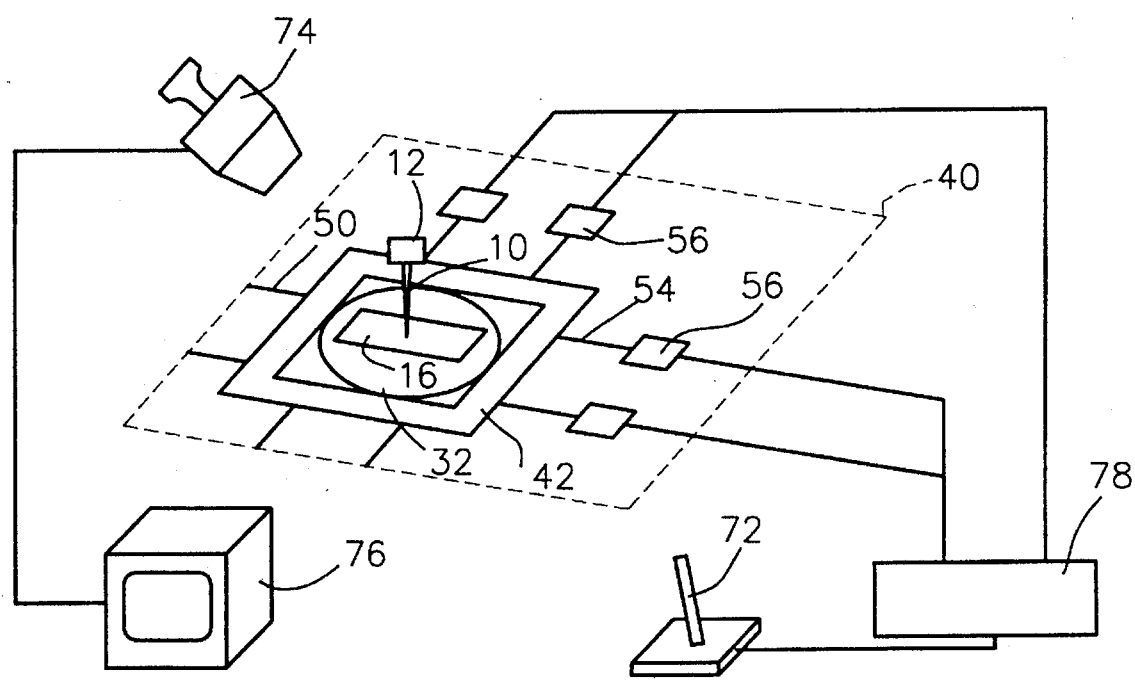
FIG. 9 is a schematic representation of a sample positioner connected to a system for controlling its movement by means of a joy stick.

Note that the concepts of the invention may be easily integrated by those skilled in the art with automated systems normally used to operate scanning microscopes. For example, as illustrated schematically in FIG. 9, the operation of the sample positioner 40 may be controlled manually by a directional lever 72, such as a joy stick, in response to visual input received through a viewfinder 74 focused on the tip of the probe 10 or through a video screen 76 connected to such viewfinder. A microprocessor 78 would normally be utilized to actuate the mechanisms effecting the motion of the sample positioner 40 in response to movements of the lever 72 and the system would preferably be programmed to cause the plate 42 to retract a predetermined, fixed distance h in response to a signal that the sample had reached a desired target location. In this mode of operation, the take-up gap h is set automatically and independently of any control action by the user, which enables rapid response and uniformity of results.

In the best mode of the invention, a scanning stage 62 made of low-friction ferromagnetic material is fixedly mounted on the top 34 of the scanning element: 18 and a magnet 68 is embedded in the lower portion of the stand-off 32, which is also made with low-friction material, to provide firmer coupling between the two. Thus, the stand-off is readily slidable over the scanning stage during the placement operation but is securely connected to it during the scanning stage. Similarly, the sample stage 38 may also be made of ferromagnetic material and a magnet 70 (which may be combined with magnet 6 in a single magnetic unit) may be provided to improve mounting of the sample stage over the stand-off 32. Obviously, in both cases the stand-off may equivalently be made of ferromagnetic material and the magnets incorporated into the top of the scanning element or of the sample stage, as applicable.

Various changes in the details, steps and materials that have been described may be made by those skilled in the art within the principles and scope of the invention herein illustrated and defined in the appended claims. For example, it is clear that the usefulness of the concept of coaxial alignment between the probe and the scanning means is not limited to piezoelectric tubes; rather it may be used advantageously with any scanning means that produces a tilt of the sample as a result of the scanning motion. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A scanning microscope for scanning a sample having a surface disposed substantially perpendicular to a tip of a probe to generate a signal indicative of a property of the sample as a function of planar coordinates along the surface of the sample, comprising:

(a) a rigid support structure
   (b) scanning means having a fixed end mounted on said support structure and a free end movable along a plane substantially perpendicular to a main axis of the scanning means in response to control signals applied to the scanning means;
   (c) a probe having a tip fixedly disposed in coaxial alignment with said main axis of the scanning means, said tip with a point on the surface of the sample precisely aligned with said tip to produce a signal indicative of said property of the sample at said point, thereby providing a map of such property as a function of position on the surface of the sample;
   (d) a stand-off slidably mounted on said free end of the scanning means, said stand-off comprising a bottom surface slidably connected to the free end of the scanning means and a top surface comprising means for receiving said sample fixedly mounted thereon; and
   (e) sample-positioner means mounted on said support structure and comprising means for slidably moving said stand-off over said free end of the scanning means in order to position the sample to a desired location for scanning, said sample-positioner means also comprising means for disengaging the stand-off after positioning of the sample and providing a sufficient gap between the stand-off and the sample-positioner means to prevent contact and resulting interference therebetween during scanning.

2. The scanning microscope recited in claim 1, wherein said scanning means consists of a piezoelectric unit.

3. The scanning microscope recited in claim 2, wherein said piezoelectric unit consists of a piezoelectric ceramic tube.

4. The scanning microscope recited in claim 1, wherein said sample-positioner means comprises a plate having an opening sufficiently large to surround said stand-off, said plate being disposed coplanarly therewith, the plate comprising means for slidably moving said stand-off in order to position the sample to a desired location for scanning and further comprising means for disengaging the stand-off after positioning of the sample, so as to provide a sufficient gap between the stand-off and the sample-positioner means to prevent contact and resulting interference therebetween during scanning.

5. The scanning microscope recited in claim 4, wherein said plate is coupled to orthogonal plungers slidably engaged by conforming guides in said support structure, said plungers being engaged by cooperatively-aligned push-pull mechanisms for sliding the plungers in and out of the guides as necessary in order to effect a desired translation of the plate to target planar coordinates.

6. The scanning microscope recited in claim 5, wherein said push-pull mechanisms consists of screw gears engaged by drivegear devices mounted on the support structure.

7. The scanning microscope recited in claim 4, further comprising apparatus for manually controlling the motion of the plate in response to a visual signal indicative of the relative position of a desired target point on the surface of the sample with respect to the tip of the probe.

8. The scanning microscope recited in claim 1, further comprising apparatus for manually controlling the motion of the sample-positioner means in response to a visual signal indicative of the relative position of a desired target point on the surface of the sample with respect to the tip of the probe.

9. The scanning microscope recited in claim 1, further comprising apparatus for automatically controlling the motion of the sample-positioner means to provide said gap between the stand-off and the sample-positioner means in response to a signal indicative of a desired target point on the surface of the sample having been placed in alignment with the tip of said probe.

10. The scanning microscope recited in claim 1, wherein said stand-off further comprises a magnet and said free end of the scanning means comprises ferromagnetic material to improve the slidable connection therewith.

11. The scanning microscope recited in claim 1,
   wherein said scanning means consists of a piezoelectric unit;
   wherein said sample-positioner means comprises a plate having an opening sufficiently large to surround said stand-off, said plate being disposed coplanarly therewith, the plate comprising means for slidably moving said stand-off in order to position the sample to a desired location for scanning and further comprising means for disengaging the stand-off after positioning of the sample, so as to provide a sufficient gap between the stand-off and the sample-positioner means to prevent contact and resulting interference therebetween during scanning; and
   wherein said scanning microscope further comprises:
   apparatus for manually controlling the motion of the sample positioner means in response to a visual signal indicative of the relative position of a desired target point on the surface of the sample with respect to the tip of the probe; and
   apparatus for automatically controlling the motion of the sample-positioner means to provide said gap between the stand-off and the sample-positioner means in response to a signal indicative of said desired target point on the surface of the sample having been placed in alignment with the tip of said probe.

12. A method of analyzing a sample having an exposed surface by scanning microscopy, comprising the following steps:

(a) providing a rigid support structure;

(b) providing scanning means having a fixed end mounted on said support structure and a free end movable along a plane substantially perpendicular to main axis of said scanning means in response to control signals applied to the scanning means, said free end comprising means for slidably mounting said sample thereon;

(c) providing a probe having a tip fixedly disposed in coaxial alignment with said main axis of the scanning means, said tip interacting with a point, the surface of the sample precisely aligned with said tip to produce a signal indicative of a property of the sample at said point;

(d) mounting the sample on said free end of the scanning means;

(e) slidably moving said sample over said free end of the scanning means in order to position the sample such that a desired target thereon is aligned with said tip of the probe for scanning; and (f) scanning the sample maintaining said tip and said scanning means in substantial coaxial alignment;

whereby a map of such property as a function of position on the surface of the sample is provided;

(g) providing a stand-off slidably mounted on said free end of the scanning means, said stand-off comprising a bottom surface slidably connected to the free end of the scanning means and a top surface to receive said sample fixedly mounted thereon; and (h) providing sample-positioner means mounted on said support structure and to slidably move said stand-off over said free end of the scanning means in order to position the sample to a desired location for scanning, said sample-positioner means also to disengage the stand-off after positioning of the sample and provide a sufficient gap between the stand-off and the sample-positioner means to prevent contact and resulting interference therebetween during scanning; and wherein step (d) is accomplished by fixedly mounting the sample on said top surface of the stand-off; and step (e) is accomplished by slidably moving said stand-off with said sample-positioner means to position the sample to said desired location for scanning and by thereafter disengaging the stand-off and providing a sufficient gap between the stand-off and the sample-positioner means to prevent contact and resulting interference therebetween during scanning.

* * * * *

UNITED STATES PATENT AND TRADEMARK OFFICE
CERTIFICATE OF CORRECTION

PATENT NO. : 5,483,064
DATED : January 9, 1996
INVENTOR(S) : Frey et al.

It is certified that error appears in the above-identified patent and that said Letters Patent is hereby corrected as shown below:

In Claim 12(b), line 11, insert: --a-- between "to" and "main"

In Claim 12(c), line 17, delete: --,-- after "point"

In Claim 12(c), line 17 insert: --on-- between "point" and "the"

Signed and Sealed this

Second Day of April, 1996

Attest:

BRUCE LEHMAN

Attesting Officer

Commissioner of Patents and Trademarks